United States Patent
Parthasarathy et al.

(10) Patent No.: US 6,831,916 B1
(45) Date of Patent: Dec. 14, 2004

(54) HOST-FABRIC ADAPTER AND METHOD OF CONNECTING A HOST SYSTEM TO A CHANNEL-BASED SWITCHED FABRIC IN A DATA NETWORK

(76) Inventors: Balaji Parthasarathy, 5 NE. Tandem Way, No. 110, Hillsboro, OR (US) 97124; Dominic J. Gasbarro, 804 Roxe Dr., Forest Grove, OR (US) 97116; Tom E. Burton, 6060 NW. Edward Ct., Beaverton, OR (US) 97006; Brian M. Leitner, 2585 NW. Overlook Dr., No. 717, Hillsboro, OR (US) 97124

( * ) Notice: Subject to any disclaimer, the term of this patent is extended or adjusted under 35 U.S.C. 154(b) by 686 days.

(21) Appl. No.: 09/671,707

(22) Filed: Sep. 28, 2000

(51) Int. Cl.[7] .............................. H04L 12/66; H04J 3/16; G06E 3/00; G06E 12/00
(52) U.S. Cl. ........................ 370/359; 370/389; 370/429; 370/463; 710/4; 710/22; 710/52; 710/73; 712/221
(58) Field of Search ................................. 370/235, 351, 370/357, 359, 389, 392, 395.7, 412, 428, 429, 463, 465; 710/4, 22, 52, 62, 72–74; 712/221

(56) References Cited

U.S. PATENT DOCUMENTS

| | | | |
|---|---|---|---|
| 5,634,015 A | 5/1997 | Chang et al. | |
| 6,188,690 B1 | 2/2001 | Holden et al. | 370/390 |
| 6,243,787 B1 * | 6/2001 | Kagan et al. | 710/263 |
| 6,400,730 B1 * | 6/2002 | Latif et al. | 370/466 |
| 6,421,711 B1 | 7/2002 | Blumenau et al. | 709/213 |
| 6,545,981 B1 | 4/2003 | Garcia et al. | 370/242 |
| 6,557,060 B1 | 4/2003 | Haren | 710/65 |
| 6,591,310 B1 * | 7/2003 | Johnson | 710/3 |
| 6,594,701 B1 | 7/2003 | Forin | 709/232 |
| 6,668,299 B1 * | 12/2003 | Kagan et al. | 710/305 |
| 6,678,782 B1 * | 1/2004 | Aydemir et al. | 710/316 |
| 6,690,757 B1 | 2/2004 | Bunton et al. | 375/371 |
| 2001/0053148 A1 * | 12/2001 | Bilic et al. | 370/389 |
| 2002/0071450 A1 | 6/2002 | Gasbarro et al. | 370/463 |
| 2003/0070014 A1 * | 4/2003 | Haren | 710/65 |

* cited by examiner

Primary Examiner—Hassan Kizou
Assistant Examiner—Ahmed Elallam
(74) Attorney, Agent, or Firm—Schwegman, Lundberg, Woessner & Kluth, P.A.

(57) ABSTRACT

A host system is provided with one or more host-fabric adapters installed therein for connecting to a switched fabric of a data network. The host-fabric adapter comprises a micro-controller subsystem configured to establish connections and support data transfers via the switched fabric, and a serial interface which provides an interface with the switched fabric. The micro-controller subsystem includes a Micro-Engine (ME) which executes a ME instruction to send source and destination addresses during a control cycle, and interface logic blocks which supply addressed data from designated sources to the Micro-Engine (ME) at the same time for execution of the ME instruction during a data cycle subsequent to the control cycle.

28 Claims, 12 Drawing Sheets

HOST-FABRIC ADAPTER AND METHOD OF CONNECTING A HOST SYSTEM TO A CHANNEL-BASED SWITCHED FABRIC IN A DATA NETWORK

TECHNICAL FIELD

The present invention relates to a data network, and more particularly, relates to a host-fabric adapter and a method of connecting a host system to a channel-based switched fabric in such a data network.

BACKGROUND

A data network generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) buses as described in the "PCI Local Bus Specification, Revision 2.1" set forth by the PCI Special Interest Group (SIG) on Jun. 1, 1995, may be utilized to deliver message data to and from I/O devices, namely storage subsystems and network devices. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution and the increased demands generated and burden imposed on server clusters, application processing, and enterprise computing created by the rapid growth of the Internet.

Emerging solutions to the shortcomings of existing PCI bus architecture are InfiniBand™ and its predecessor, Next Generation I/O (NGIO) which have been developed by Intel Corporation to provide a standards-based I/O platform that uses a switched fabric and separate I/O channels instead of a shared memory-mapped bus architecture for reliable data transfers between end-nodes, as set forth in the "Next Generation Input/Output (NGIO) Specification," NGIO Forum on Jul. 20, 1999 and the "InfiniBand™ Architecture Specification," the InfiniBand™ Trade Association scheduled for publication in late October 2000. Using NGIO/InfiniBand™, a host system may communicate with one or more remote systems using a Virtual Interface (VI) architecture in compliance with the "Virtual Interface (VI) Architecture Specification, Version 1.0," as set forth by Compaq Corp., Intel Corp., and Microsoft Corp., on Dec. 16, 1997. NGIO/InfiniBand™ and VI hardware and software may often be used to support data transfers between two memory regions, typically on different systems over one or more designated channels. Each host system using a VI Architecture may contain work queues (WQ) formed in pairs including inbound and outbound queues in which requests, in the form of descriptors, are posted to describe data movement operation and location of data to be moved for processing and/or transportation via a data network. Each host system may serve as a source (initiator) system which initiates a message data transfer (message send operation) or a target system of a message passing operation (message receive operation). Requests for work (data movement operations such as message send/receive operations and remote direct memory access "RDMA" read/write operations) may be posted to work queues associated with a given network interface card. One or more channels between communication devices at a host system or between multiple host systems connected together directly or via a data network may be created and managed so that requested operations can be performed.

Since NGIO/InfiniBand™ is an emerging interconnect technology not yet in the marketplace, there is no known interface mechanism specifically implemented for NGIO/InfiniBand™ applications. More specifically, there is no known network interface card (NIC) for a host system to connect to a data network using a channel-based, switched fabric architecture to support data movement operations between communication devices at a host system or between host systems connected together directly or via a data network. Existing network interface cards for host systems are not adapted for emerging NGIO/InfiniBand™ interconnect technology and are, therefore, not optimized for NGIO/InfiniBand™ functionality.

Accordingly, there is a need for an especially designed, performance-driven host-fabric adapter installed at a host system in a data network using a channel-based, switched fabric architecture, optimized for NGIO/InfiniBand™ functionality, including controlling execution of NGIO/InfiniBand™ protocols with minimal pipelining and data processing with minimal latency.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
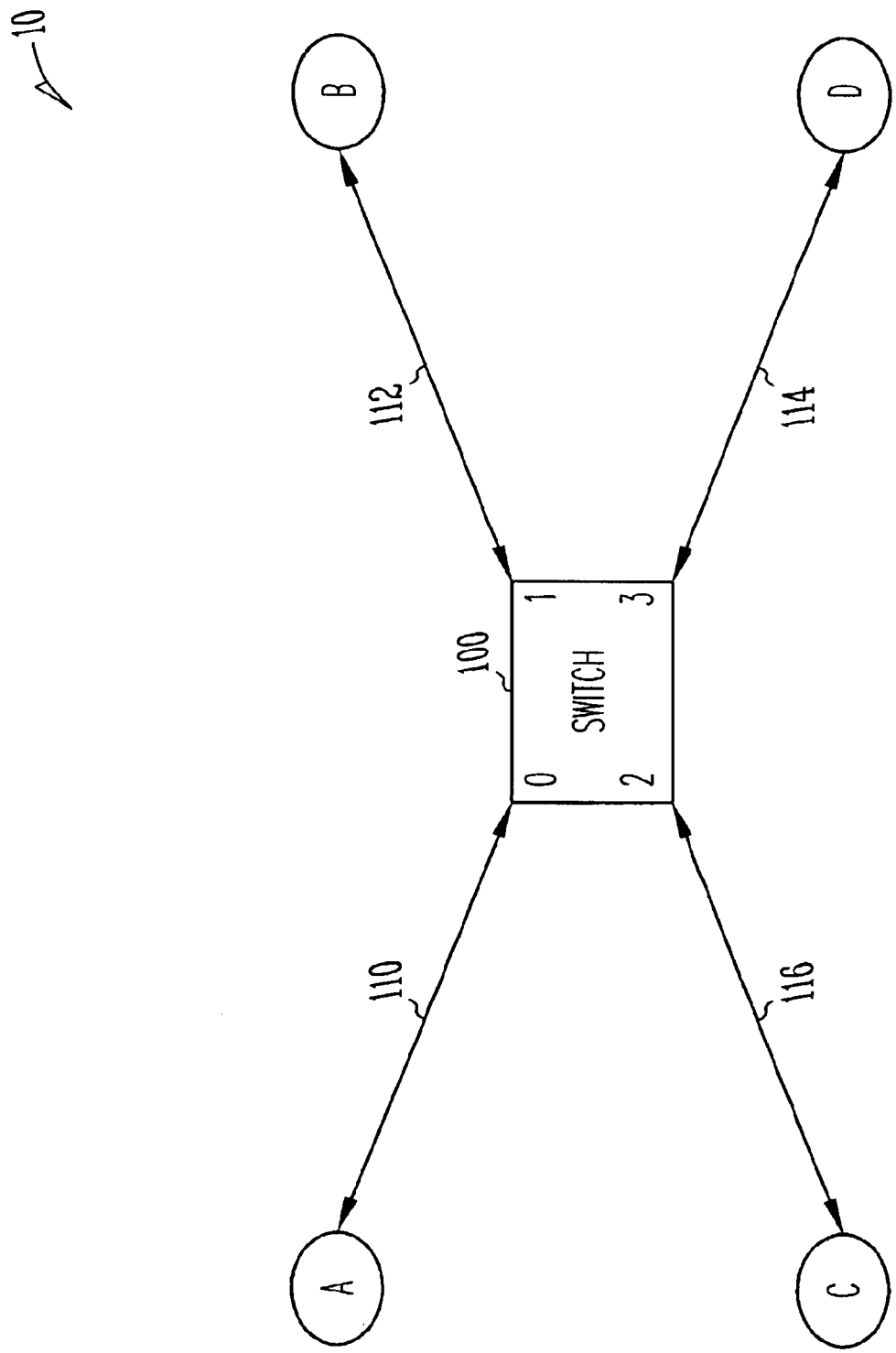
FIG. 1 illustrates an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of endpoints or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the "*Next Generation Input/Output* (NGIO) *Specification*" as set forth by the NGIO Forum on Jul. 20, 1999, and the "*InfiniBand™ Architecture Specification*" as set forth by the InfiniBand™ Trade Association on late October 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "*Next Generation I/O Link Architecture Specification: HCA Specification, Revision* 1.0" as set forth by NGIO Forum on May 13, 1999, and/or the *InfiniBand™ Specification* for enabling the endpoints (nodes) to communicate to each other over an NGIO/InfiniBand™ channel(s).

Figure 2:
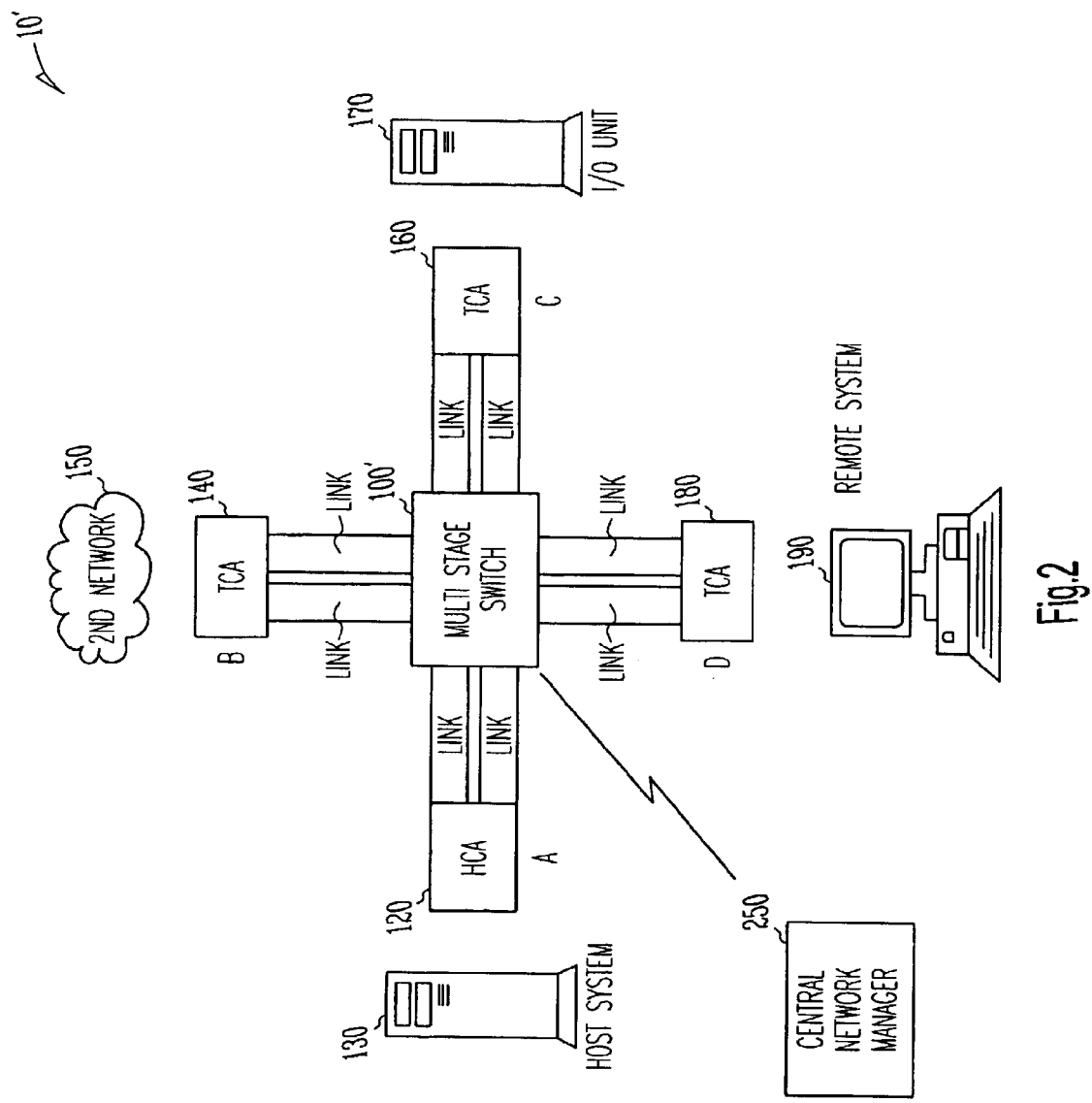
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow two work queue pairs (WQPs) at source and destination endpoints (e.g., host and remote systems, and 10 units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of cells between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions. In either situation, the fabric manager 250 may be configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter 20 (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 100', and may be implemented in compliance with "Next Generation I/O Link Architecture Specification: HCA Specification, Revision 1.0" as set forth by NGIO Forum on May 13, 1999 for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

Figure 3:
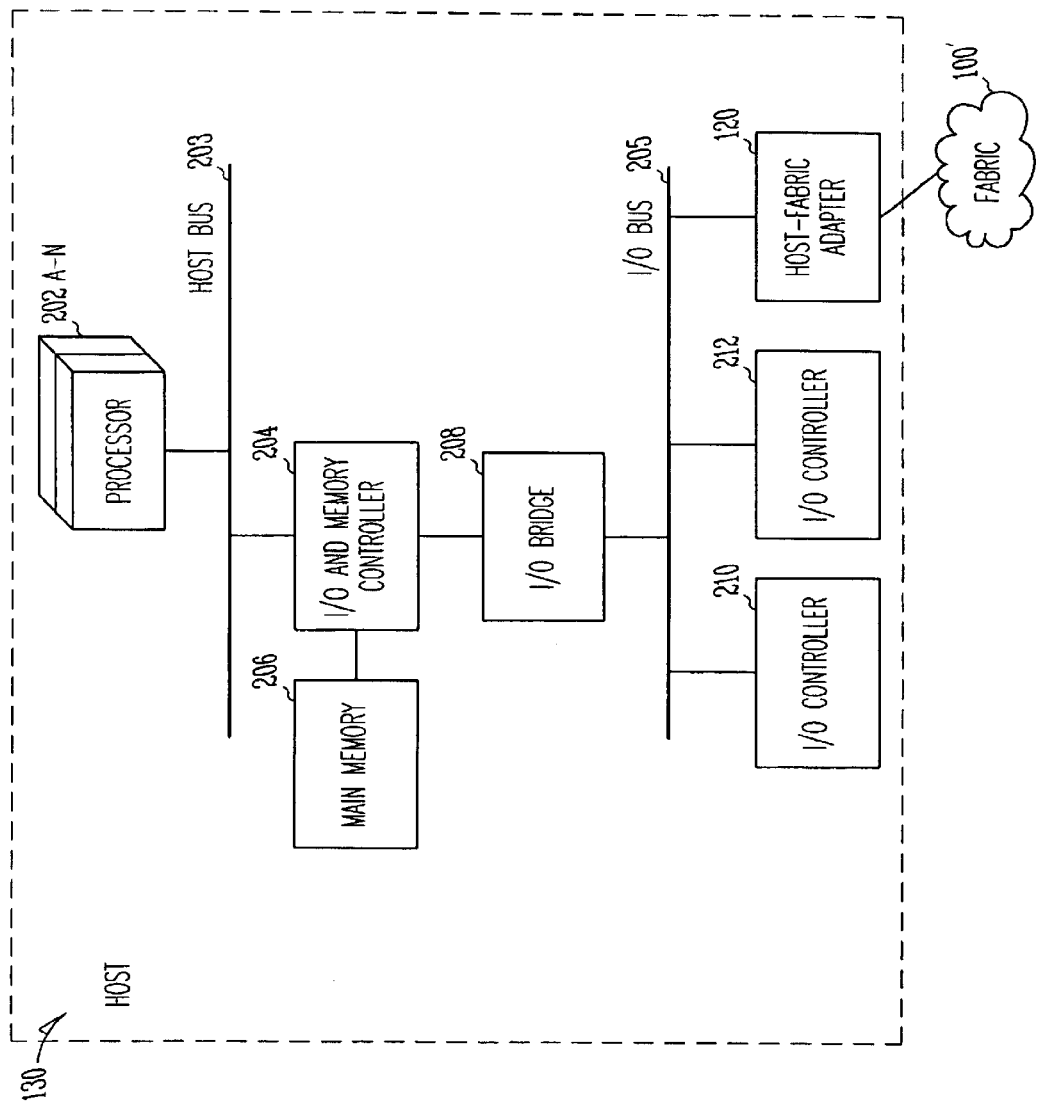
FIG. 3 illustrates a block diagram of an example host system of an example data network according to an embodiment of the present invention.

Returning to discussion, one example embodiment of a host system 130 may be shown in FIG. 3. Referring to FIG. 3, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 4:
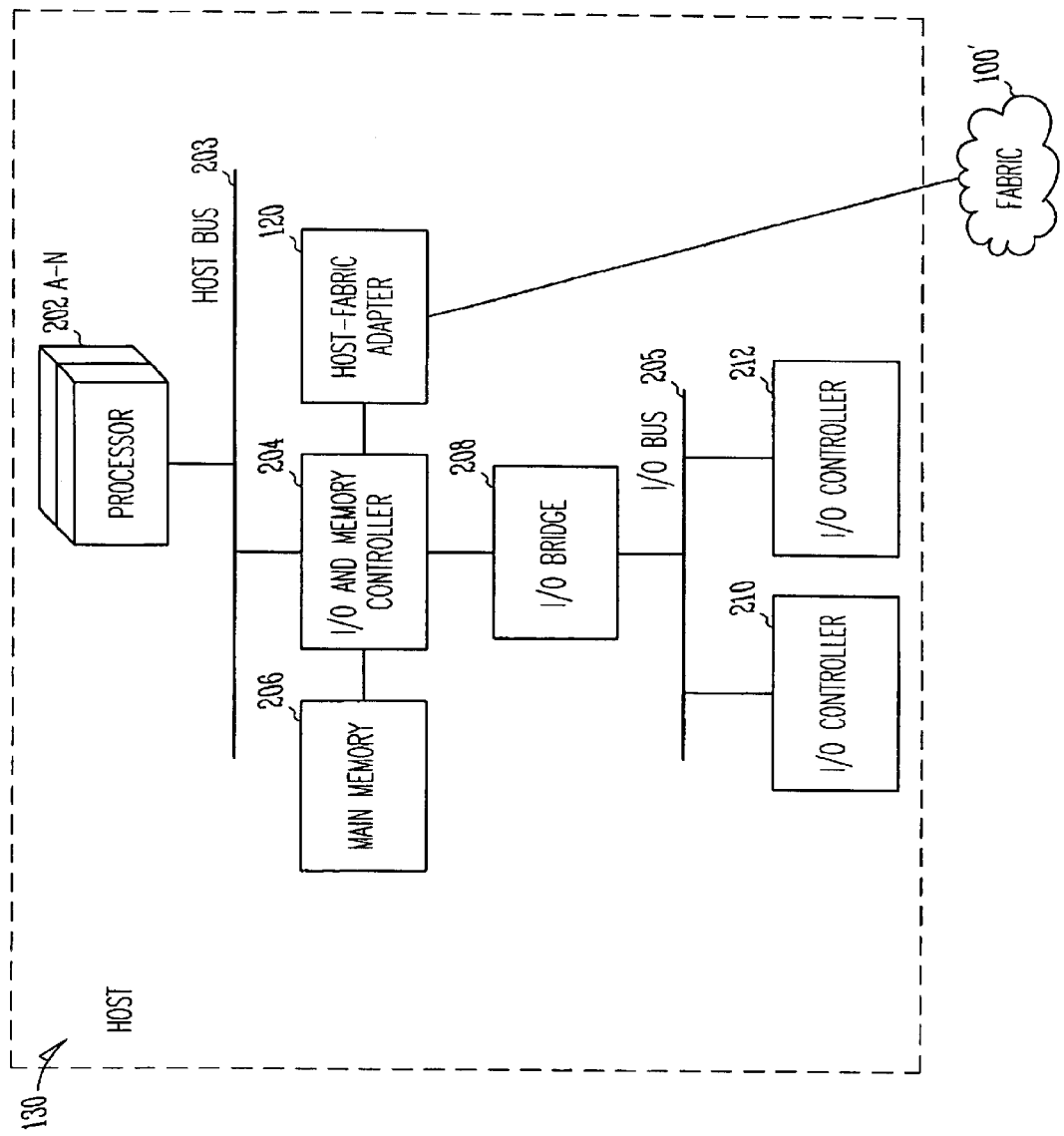
FIG. 4 illustrates a block diagram of an example host system of an example data network according to another embodiment of the present invention.

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4. In either embodiment shown in FIGS. 3–4, one or more host-fabric adapters 120 may be provided to interface the host system 130 to the NGIO switched fabric 100'.

FIGS. 3–4 merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the switched fabric 100', while preferably being compatible with many currently available operating systems, such as Windows 2000.

Figure 5:
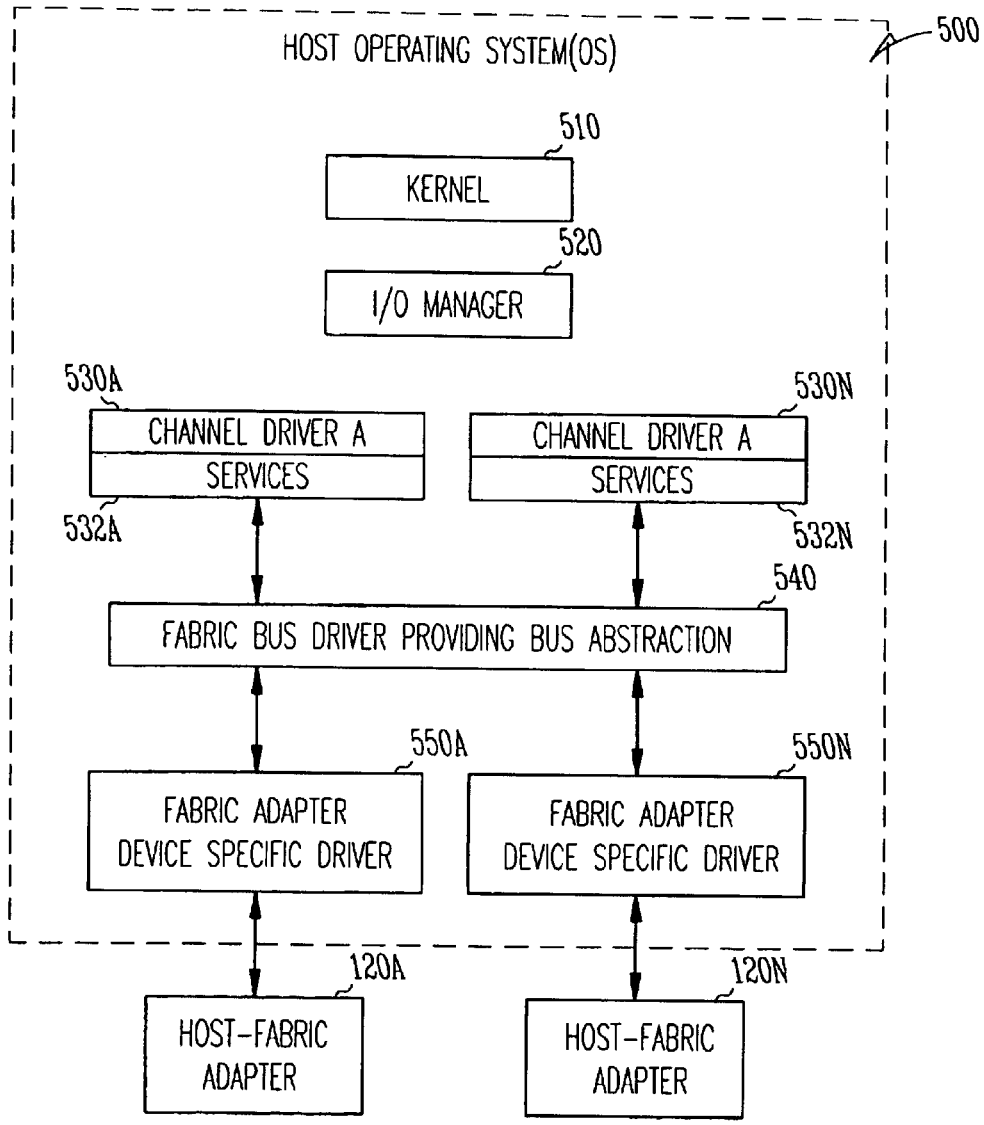
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and one or more fabric adapter device-specific drivers 550A–550N utilized to establish communication with devices attached to the switched fabric 100' (e.g., I/O controllers), and perform functions common to most drivers. Such a host operating system (OS) 500 may be Windows 2000, for example, and the I/O manager 520 may be a Plug-n-Play manager.

Channel drivers 530A–530N provide the abstraction necessary to the host operating system (OS) to perform IO operations to devices attached to the switched fabric 100', and encapsulate IO requests from the host operating system (OS) and send the same to the attached device(s) across the switched fabric 100'. In addition, the channel drivers 530A–530N also allocate necessary resources such as memory and Work Queues (WQ) pairs, to post work items to fabric-attached devices.

The host-fabric adapter software stack (driver module) may be provided to access the switched fabric 100' and information about fabric configuration, fabric topology and connection information. Such a host-fabric adapter software stack (driver module) may be utilized to establish communication with a remote system (e.g., I/O controller), and perform functions common to most drivers, including, for example, host-fabric adapter initialization and configuration, channel configuration, channel abstraction, resource management, fabric management service and operations, send/receive 10 transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter (HCA) driver module may consist of three functional layers: a HCA services layer (HSL), a HCA abstraction layer (HCAAL), and a HCA device-specific driver (HDSD) in compliance with the *"Next Generation I/O Architecture: Host Channel Adapter Software Specification"*, the *"Next Generation I/O: Intel HCA Connection Services Layer High Level Design"*, the *"Next Generation I/O: Intel HCA Abstraction Layer High Level Design"*, and the *"Next Generation I/O: Intel HCA Fabric Services Layer High Level Design"* as set forth by Intel on Aug. 6,1999 For instance, inherent to all channel drivers 530A–530N may be a Channel Access Layer (CAL) including a HCA Service Layer (HSL) for providing a set of common services 532A–532N, including fabric services, connection services, and HCA services required by the channel drivers 530A–530N to instantiate and use NGIO/InfiniBand™ protocols for performing data transfers over NGIO/InfiniBand™ channels. The fabric bus driver 540 may correspond to the HCA Abstraction Layer (HCAAL) for managing all of the device-specific drivers, controlling shared resources common to all HCAs in a host system 130 and resources specific to each HCA in a host system 130, distributing event information to the HSL and controlling access to specific device functions. Likewise, one or more fabric adapter device-specific drivers 550A–550N may correspond to HCA device-specific drivers (for all type of brand X devices and all type of brand Y devices) for providing an abstract interface to all of the initialization, configuration and control interfaces of one or more HCAs. Multiple HCA device-specific drivers may be present when there are HCAs of different brands of devices in a host system 130.

More specifically, the fabric bus driver 540 or the HCA Abstraction Layer (HCAAL) may provide all necessary services to the host-fabric adapter software stack (driver module), including, for example, to configure and initialize the resources common to all HCAs within a host system, to coordinate configuration and initialization of HCAs with the HCA device-specific drivers, to control access to the resources common to all HCAs, to control access the resources provided by each HCA, and to distribute event notifications from the HCAs to the HCA Services Layer (HSL) of the Channel Access Layer (CAL). In addition, the fabric bus driver 540 or the HCA Abstraction Layer (HCAAL) may also export client management functions, resource query functions, resource allocation functions, and resource configuration and control functions to the HCA Service Layer (HSL), and event and error notification functions to the HCA device-specific drivers. Resource query functions include, for example, query for the attributes of resources common to all HCAs and individual HCA, the status of a port, and the configuration of a port, a work queue pair (WQP), and a completion queue (CQ). Resource allocation functions include, for example, reserve and release of the control interface of a HCA and ports, protection tags, work queue pairs (WQPs), completion queues (CQs). Resource configuration and control functions include, for example, configure a port, perform a HCA control operation and a port control operation, configure a work queue pair (WQP), perform an operation on the send or receive work queue of a work queue pair (WQP), configure a completion queue (CQ), and perform an operation on a completion queue (CQ).

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the *"Virtual Interface (VI) Architecture Specification, Version 1.0,"* as set forth by Compaq Corp., Intel Corp., and Microsoft Corp., on Dec. 16, 1997. VI architecture may support data transfers between two memory regions, typically on different systems over one or more designated channels of a data network. Each system using a VI Architecture may contain work queues (WQ) formed in pairs including inbound (receive) and outbound (send) queues in which requests, in the form of descriptors, are posted to describe data movement operation and location of data to be moved for processing and/or transportation via a switched fabric 100'. The VI Specification defines VI mechanisms for low-latency, high-bandwidth message-passing between interconnected nodes connected by multiple logical point-to-point channels. However, other architectures may also be used to implement the present invention.

Figure 6:
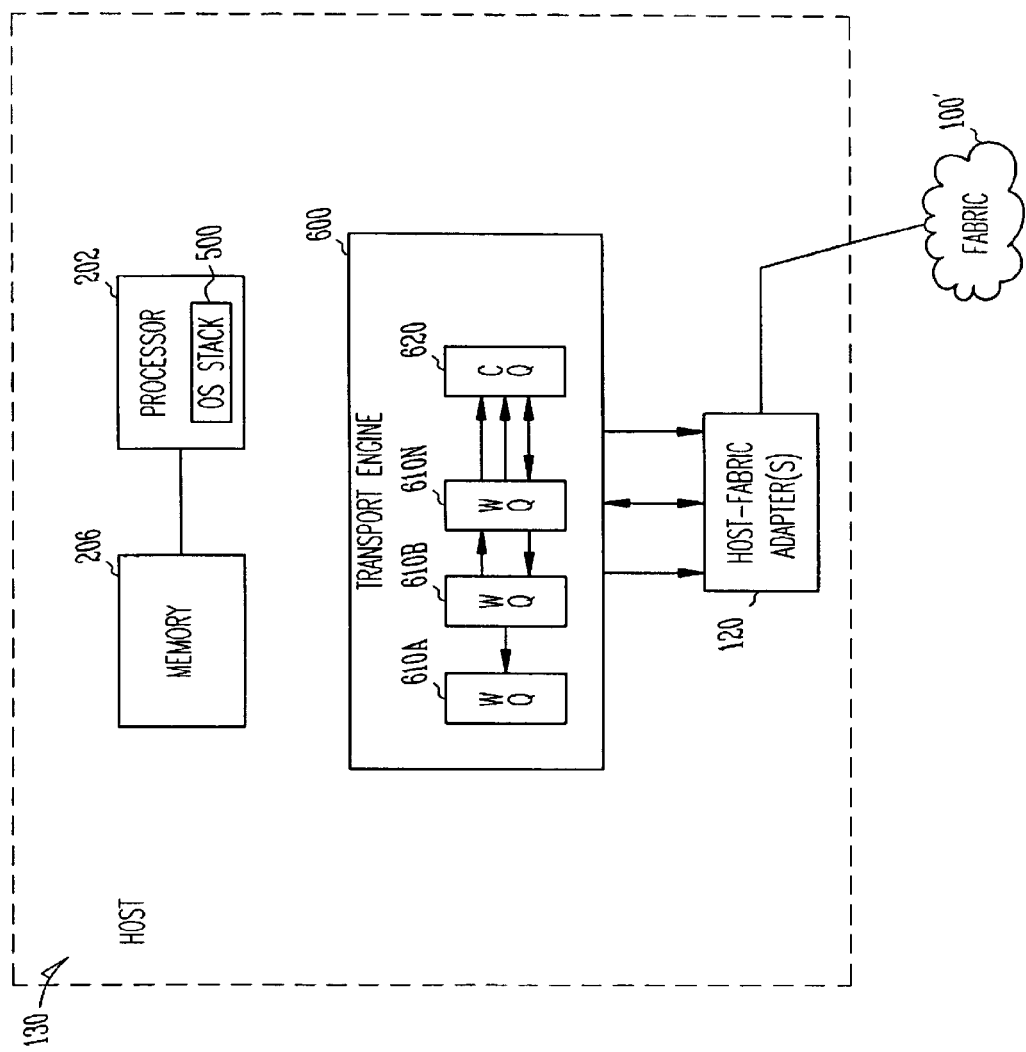
FIG. 6 illustrates a block diagram of an example host system using NGIO/InfiniBand™ and VI architectures to support data transfers via a switched fabric according to an embodiment of the present invention.

FIG. 6 illustrates an example host system using NGIO/InfiniBand™ and VI architectures to support data transfers via a switched fabric 100'. As shown in FIG. 6, the host system 130 may include, in addition to one or more processors 202 containing an operating system (OS) stack 500, a host memory 206, and at least one host-fabric adapter (HCA) 120 as shown in FIGS. 3–5, a transport engine 600 provided in the host-fabric adapter (HCA) 120 in accordance with NGIO/InfiniBand™ and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including inbound (receive) and outbound (send) queues, such as work queues (WQ) 610A–610N in which requests, in the form of descriptors, may be posted to describe data movement operation and location of data to be moved for processing and/or transportation via a switched fabric 100', and completion queues (CQ) 620 may be used for the notification of work request completions. Alternatively, such a transport engine 600 may be hardware memory components of a host memory 206 which resides separately from the host-fabric adapter (HCA) 120 so as to process completions from multiple host-fabric adapters (HCAs) 120, or may be provided as part of kernel-level device drivers of a host operating system (OS). In one embodiment, each work queue pair (WQP) including separate inbound (receive) and outbound (send) queues has a physical port into a switched fabric 100' via a host-fabric adapter (HCA) 120. However, in other embodiments, all work queues may share physical ports into a switched fabric 100' via one or more host-fabric adapters (HCAs) 120. The outbound queue of the work queue pair (WQP) may be used to request, for example, message sends, remote direct memory access "RDMA" reads, and remote direct memory access "RDMA" writes. The inbound (receive) queue may be used to receive messages.

In such an example data network, NGIO/InfiniBand™ and VI hardware and software may be used to support data transfers between two memory regions, often on different systems, via a switched fabric 100'. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented IO services. Requests for work (data movement operations such as message send/receive operations and RDMA read/write operations) may be posted to work queues (WQ) 610A–610N associated with a given fabric adapter (HCA), one or more channels may be created and effectively managed so that requested operations can be performed.

Figure 7:
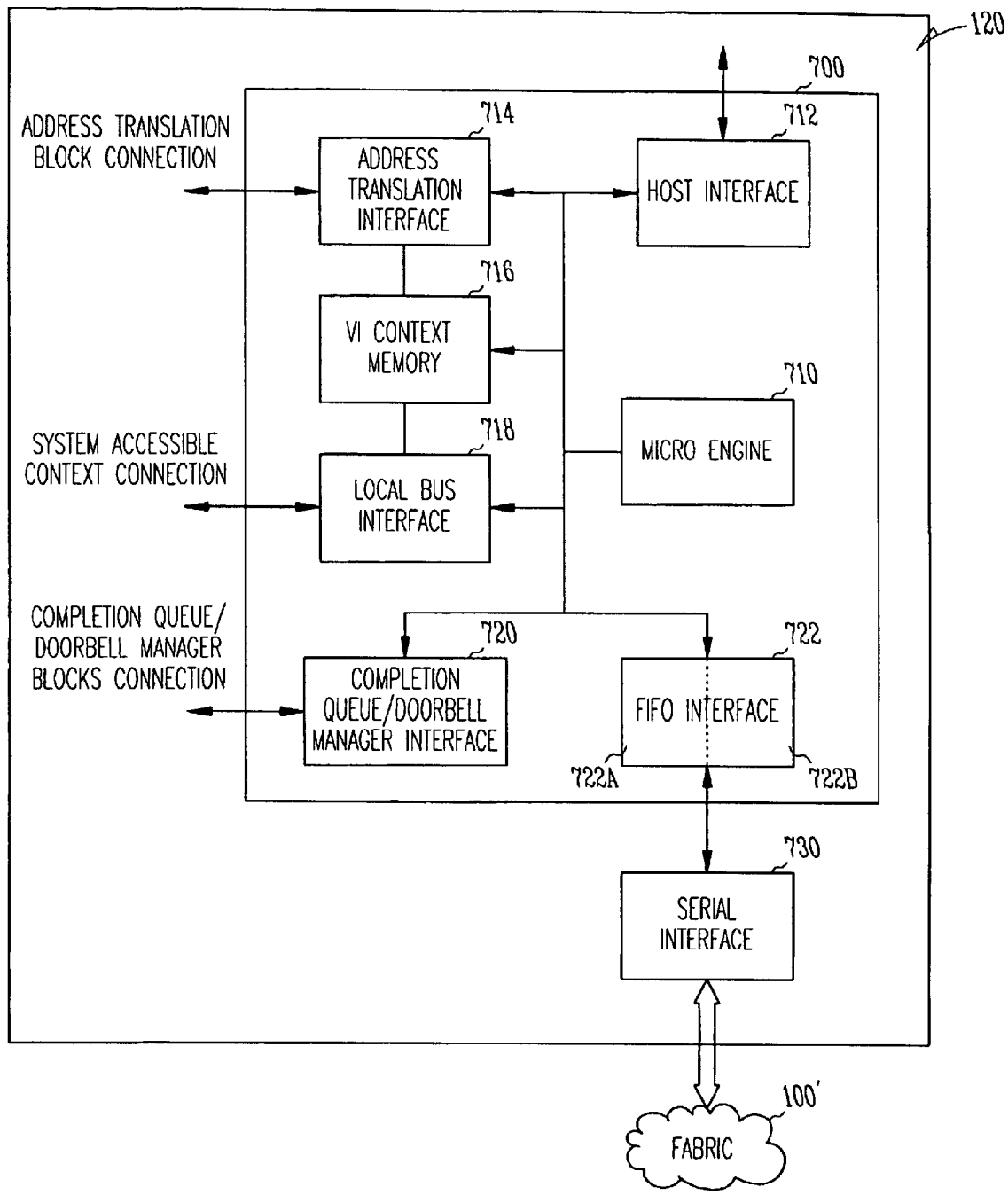
FIG. 7 illustrates an example host-fabric adapter configured in accordance with NGIO/InfiniBand™ and VI architectures to support data transfers via a switched fabric 100' according to an embodiment of the present invention.

Turning now to FIG. 7, an example host-fabric adapter 120 installed at a host system and configured in accordance with NGIO/InfiniBand™ and VI architectures to support data transfers via a switched fabric 100' according to an embodiment of the present invention is illustrated. The example host-fabric adapter 120 is especially designed to connect a host system to a channel-based switched fabric 100' of a data network 100 for services to efficiently establish and manage NGIO/InfiniBand™ channels and support data movement operations between communication devices at a host system or between host systems connected together directly or via the data network 100' using a channel-based, switched fabric architecture. In addition, the host-fabric adapter 120 implements hardware designed for increased performance and efficiency, and optimized for NGIO/InfiniBand™ functionality with minimal hardware investment, including controlling execution of NGIO/InfiniBand™ protocols with minimal pipelining and NGIO/InfiniBand™ cell data processing with minimal cell latency.

As shown in FIG. 7, the host-fabric adapter 120 may include a micro-controller subsystem 700 which controls the execution of the NGIO/InfiniBand™ protocols, and a serial interface 730 which provides an interface with the switched fabric 100'. The micro-controller subsystem 700 contains one or more programmable direct-memory-access (DMA) engine(s) known as a Micro-Engine (ME) 710 utilized to build, send, receive and acknowledge NGIO/InfiniBand™ cells between the host memory 206 (see FIG. 6) and a serial link, and special purpose hardware interface logic blocks such as a host interface 712, an address translation interface 714, a VI context memory interface 716, a local bus interface 718, a completion queue/doorbell manager interface 720, and a first-in/first-out (FIFO) interface 722 controlled by the Micro-Engine (ME) 710 to perform many ME functions needed to implement the NGIO/InfiniBand™ and VI specifications, including, for example, host transactions, context updates, physical address translations, host descriptor fetches, doorbell management, FIFO data movements and completion queue management.

The Micro-Engine (ME) 710 may execute MicroCode to coordinate send queue and receive queue operations for transmitting and receiving NGIO/InfiniBand™ cells and to support completion queues and channels in compliance with the NGIO/InfiniBand protocols. The Micro-Engine (ME) 710 may also control all the interface blocks through a set of micro register reads and writes. Micro registers may be available with data supplied by multiple interface blocks to help speed up MicroCode functions.

The host interface 712 provides an interface to either an I/O bus 205 of a host system 130 as shown in FIG. 3, or an I/O and memory controller 204 of a host system 130 as shown in FIG. 4 for host transactions, including controlling arbitration and data/control multiplexing between different requesters, read and write transactions to the host system 130 and facilitating read completions.

The address translation interface 714 provides an interface to an address translation block (not shown) responsible for managing the conversion of virtual address (used to address program space) to physical addresses (used to address system space) and validating access to memory.

The context memory interface 716 provides an interface to a context manager (not shown) responsible for providing the necessary context for a work queue pair (WQP) used for sending and receiving a NGIO/InfiniBand™ cell/packet. The context memory interface 716 also provides an interface to host software and presents different types of memory mapped register sets which specify channel configurations and to initiate channel operations. For example, the memory mapped register sets may include global HCA context registers which affect the operation of work queues (WQ), work queue pair(WQP) registers which control the establishment of channels, and completion queue registers which specify the location and length of a completion queue (CQ) in host memory 206 and control whether interrupts are generated when completion queues entries are written.

The local bus interface 718 provides an interface to a local data bus responsible for supporting system accessible context connections and channel operations, and for turning the signal data into appropriate forms for the Micro-Engine (ME) 710, including MicroCode loading.

The completion queue/doorbell manager interface 720 provides an interface to completion queues, and doorbell manager and memory registration rules of the VI architecture.

The FIFO interface 722 provides an interface to the switched fabric 100' via a serial interface 730. The FIFO interface 722 may include a Receive FIFO interface (RFI) 722A arranged to receive request(s) and/or data packet(s) from the switched fabric 100' via a Receive FIFO and a serial interface 730, and a Transmit FIFO interface (TRI) 722B arranged to send request(s) and/or data packet(s) to the switched fabric 100' via a serial interface 730.

The Receive FIFO interface 722A may be used by the Micro-Engine (ME) 710 to process the incoming cell, via the serial interface 730, including checking the cell header for errors and checking if additional data needs to be read before passing the same to the host interface 712. The Transmit FIFO interface 722B may be used by the Micro-Engine (ME) 710 to build cells for subsequent transmission, via the serial interface 730.

In addition, a Scheduler (not shown) may also be included for scheduling the next Virtual Interface (VI) to the context manager and supporting priority of traffic for data cells or packets associated with send work queues and receive work queues. Such a Scheduler may be provided to interface with the VI context memory interface 716, the local bus interface 718 and the completion queue/doorbell manager interface 720 for scheduled functions.

Figure 8:
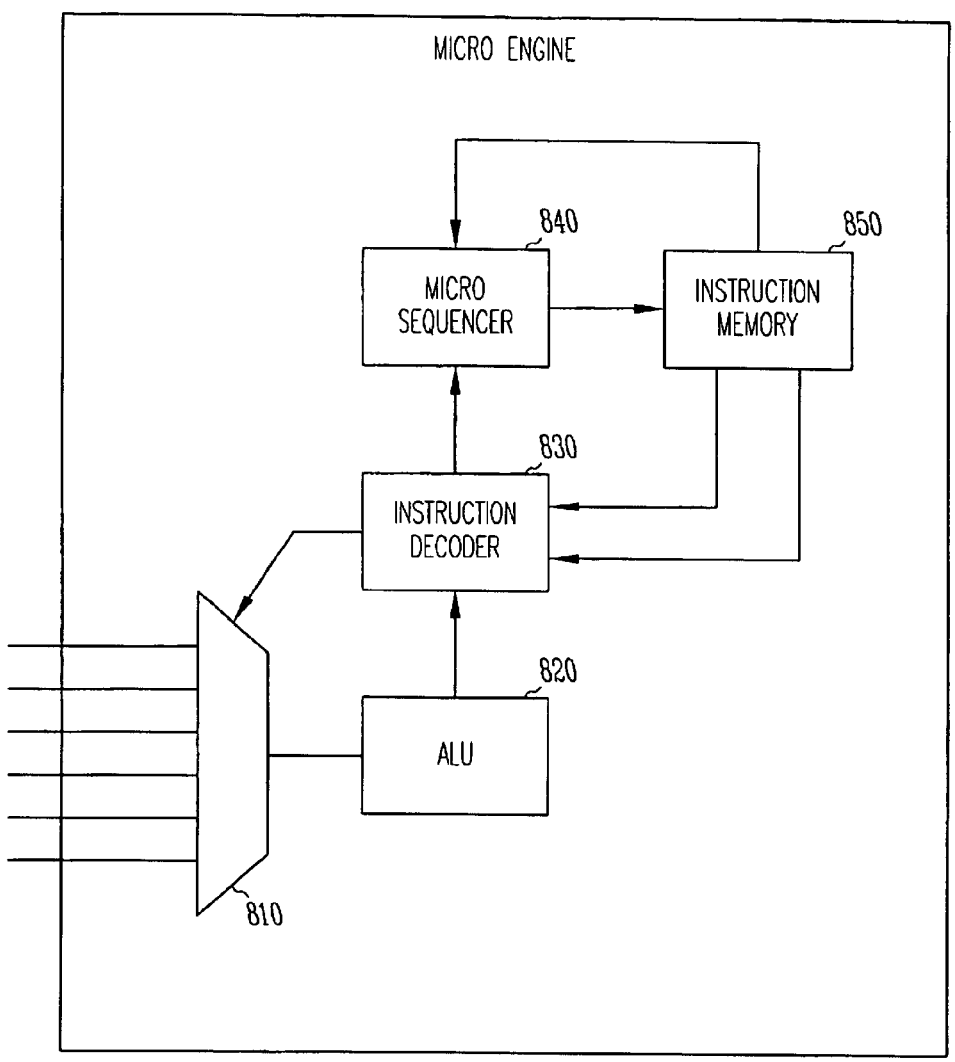
FIG. 8 illustrates an example Micro-Engine (ME) of a host-fabric adapter according to an embodiment of the present invention.

FIG. 8 illustrates a general example Micro-Engine (ME) 710 configured to handle multiple independent operations (known as tasks) for performance efficiency with minimum hardware investment according to an embodiment of the present invention. As shown in FIG. 8, the Micro-Engine (ME) 710 may comprise one or more Data Multiplexers (MUXs) 810, an Arithmetic Logic Unit (ALU) 820, an Instruction Decoder 830, a Micro-Sequencer 840, and an Instruction Memory 850. The Instruction Memory 850 may store downloadable micro-codes which are ME instructions. The data MUXs 810 may supply appropriate interface data based on ME instructions. The Arithmetic Logic Unit (ALU) 820 may perform any mathematical, logical and shifting operations. The Instruction Decoder 830 may supply controls to the Micro-Sequencer 840 to determine the next instruction or address to be executed, execute ME instructions from the Instruction Memory 850, and determine the functions of the ALU 820. The Micro-Sequencer 840 may check the sequence of ME instructions and determine which next instruction is to be executed by the Instruction Decoder 820.

Figure 9:
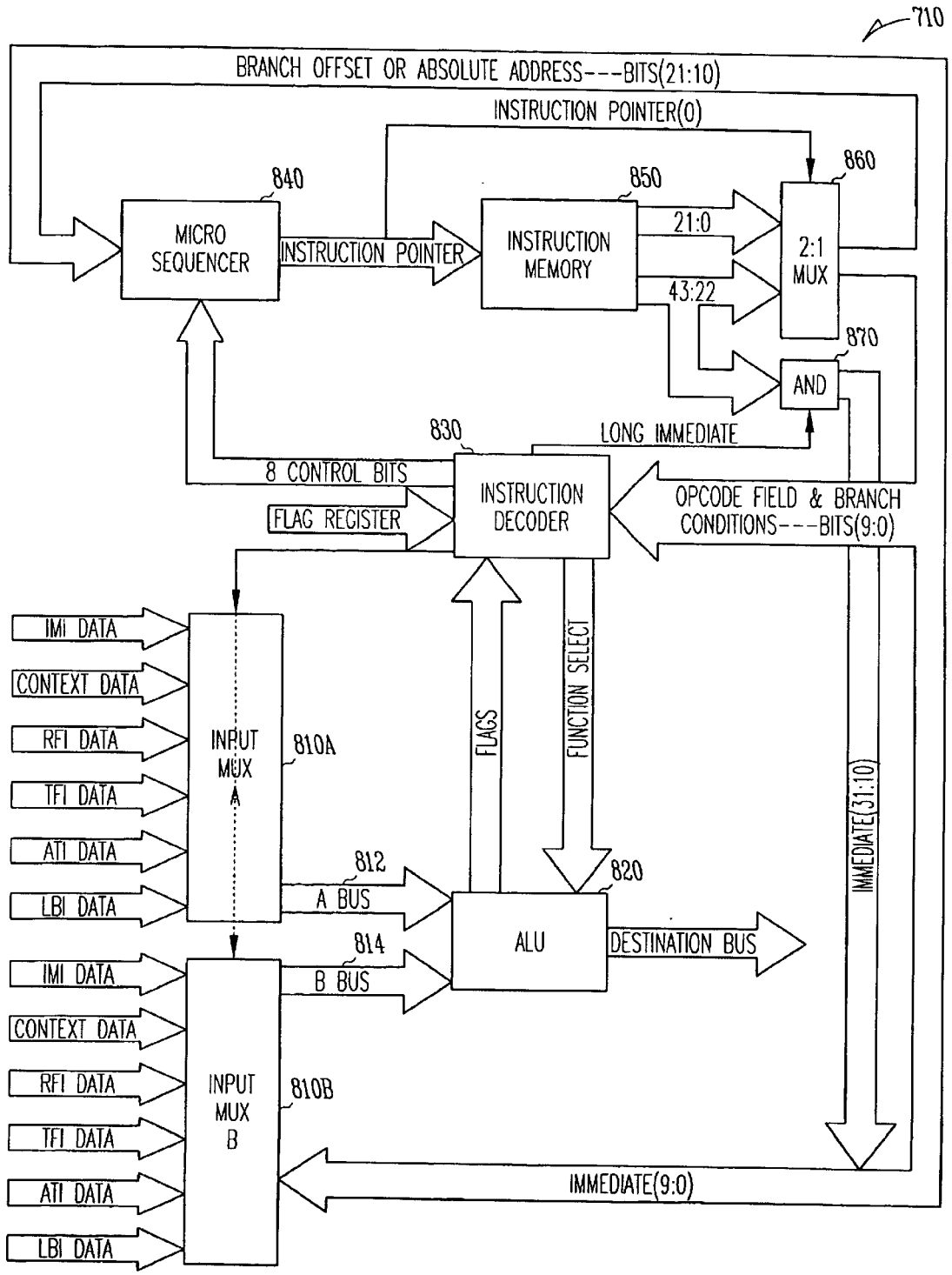
FIG. 9 illustrates an example implementation of a Micro-Engine (ME) of a host-fabric adapter according to an embodiment of the present invention.

One example implementation of the data MUXs 810, the Arithmetic Logic Unit (ALU) 820, the Instruction Decoder 830, the Micro-Sequencer 840, and the Instruction Memory 850 of an example Micro-Engine (ME) 710 may be described with reference to FIG. 9 hereinbelow:

Data MUX 810: There may be two input data MUXs, input MUX-A 810A and input MUX-B 810B which supply two 32-bit buses (A-bus and B-bus) inputs to the ALU 820. The A-bus 812 may supply data based on decode of the destination field of the ME instruction to the ALU 820. Likewise, the B-bus 814 may supply data based on decode of the source field of the ME instruction to the ALU 820. The data inputs to the input data MUXs 810A and 810B may be supplied by external interface blocks such as the host interface 712, the address translation interface 714, the context memory interface 716, the local bus interface 718, the completion queue/doorbell manager interface 720, and the first-in/first-out (FIFO) interface 722 needed to control many ME functions. The input MUX-B 810B may include Immediate Data from the ME instruction. The decode of the destination/source field, which generate the selects for the MUXs, may be executed by the Instruction Decoder 830.

Arithmetic Logic Unit (ALU) 820: The ALU 820 may contain two (A and B) 32-bit data inputs and perform functions that are based on the OpCode field of the ME instruction. The functions supported include, but are not limited to, Add, Subtract, OR, XOR, AND, Compare, Rotate Right, Shift Left, Bit test and Move (pass through). The Instruction Decoder 830 decodes the ME instruction and provides the function select signals to the ALU 820. After executing the selected function, the ALU 820 sets flags based on the outcome. The flags may include, for example, Zero and Carry. If the result of an arithmetic function is zero, the Z flag may be set. In contrast, if the arithmetic function results in a carry out, the C flag may be set. Results of ALU functions may affect the state of the Z flag.

Instruction Memory 850: The Instruction Memory 850 may be a static random-access-memory SRAM provided to store MicroCode for providing ME instructions via 2:1 Multiplexer (MUX) 860 and logic AND gate 870. Micro-Code may be downloadable into the SRAM for changes in future NGIO/InfiniBand TM specification enhancements. The SRAM may contain 2K ×44 bits and may be loaded via the local bus. Each ME instruction may be 22 bits, for example, and two instructions may be allowed for each word of SRAM. Instructions with 32 bit Immediate Data occupy 44 bits, counting as two instructions. The MicroCode supplied by the SRAM may be available in different formats.

Micro-Sequencer 840: The Micro-Sequencer 840 may determine the address sequence of the Micro-Engine (ME) 710 from the decode of the ME instruction and Flag register information. The next address sequence may be controlled by the Instruction Decoder 830 which passes 8 bits of Control Field information (i.e., 8 Control Field signals) to the Micro-Sequencer 840.

During any single clock cycle, multiple tasks may be performed by the Micro-Engine (ME) 710 to increase performance efficiency with minimum hardware investment. These multiple tasks include, but are not limited to, physical address translations, host descriptor fetches, doorbell management, FIFO data movement and completion queue management. More importantly, the control cycle and data cycle may be pipelined to allow single cycle ME instruction execution in order to process NGIO/InfiniBand™ cells with minimal latency.

Figure 10:
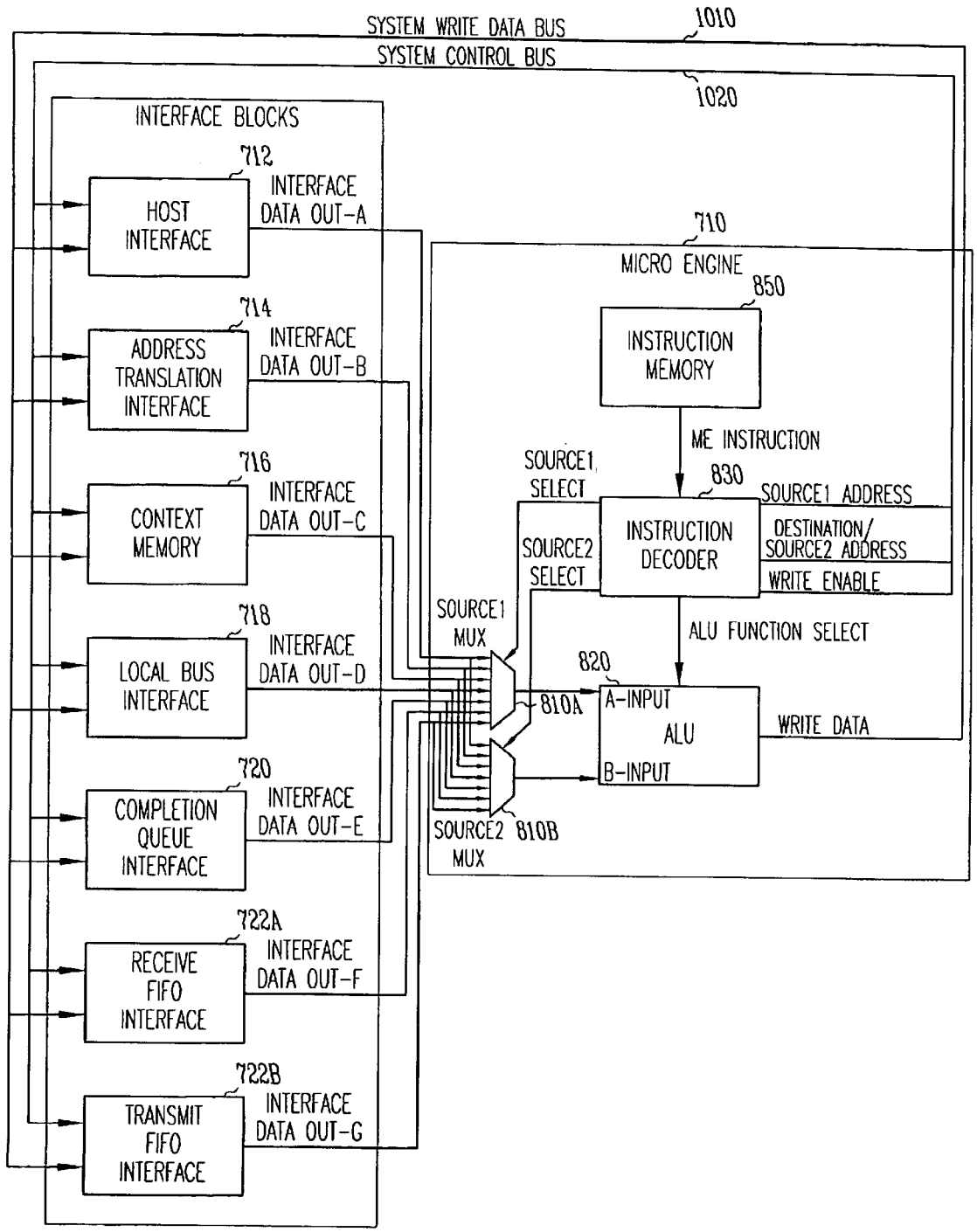
FIG. 10 illustrates an example Micro-Engine (ME) architecture configured to pipeline a single cycle ME instruction and data cycle execution according to an embodiment of the present invention.

For example, FIG. 10 illustrates an example Micro-Engine (ME) architecture configured to implement a single cycle ME instruction and data cycle execution according to an embodiment of the present invention. As shown in FIG. 10, a common system Write Data bus 1010 and a system Control bus 1020 are utilized for transporting write data from the ALU 820 and system controls (e.g., Source1 Address, Destination/Source2 Address and Write Enable) from the Instruction Decoder 830 to all interface blocks, including the host interface 712, the address translation interface 714, the context memory interface 716, the local bus interface 718, the completion queue/doorbell manager interface 720, the Receive FIFO interface 722A and the Transmit FIFO interface 722B.

System controls originate from the ME instruction. Source and Destination addresses may be extracted from the ME instruction and may be sent to the interface blocks by the Instruction Decoder 830 in the Micro-Engine (ME) 710. Each interface block may then determine if Source1 Address is in its address space. The interface block associated with Source1 Address may drive the addressed data to the Micro-Engine (ME) 710 on its Interface Data Out lines. The interface blocks not addressed by Source-1 Address may decode the Destination/Source2 Address. The interface block associated with Destination/Source2 Address may then drive the addressed data to the Micro-Engine (ME) 710 on its Interface Data Out lines. This interface block may supply the data for all transactions even if Source2 Address is not used.

When the ME instruction decoded by the Instruction Decoder 830 indicates that two sources are to be used (i.e. ADD instruction), Source1 Select and Source2 Select may be generated from the Instruction Decoder 830 to control the respective MUXs 810A and 810B to supply the correct input data to the ALU 820 of the Micro-Engine (ME) 710. In addition, the ALU function select may also be generated from the Instruction Decoder 830 to control ALU operation allowing the destination data (ALU results) onto the Write Data bus 1010.

All interface blocks may decode the Destination/Source2 Address that is separated from those used to supply interface data out to the Micro-Engine (ME) 710. Interface blocks may use this decode to determine if their address space is the destination for the ME Write Data. The Write Data may then be supplied to the destination register and written if the ME supplies Write Enable. The Micro-Engine (ME) 710 decodes the instruction to determine if data is to be written to the destination interface (i.e. MOVE instruction decodes).

System controls may be supplied to the interface blocks a clock cycle ahead of the data so as to allow the interface blocks time to decode the source and destination fields. Pipelining the control cycle and data cycle also allows single cycle ME instruction execution. Single cycle instruction and data cycle execution advantageously allows both sources supplied to the Micro-Engine (ME) 710 at the same time and enables the Micro-Engine (ME) 710 to perform at peak efficiency to process NGIO/InfiniBand cells with minimum latency.

Figure 11:
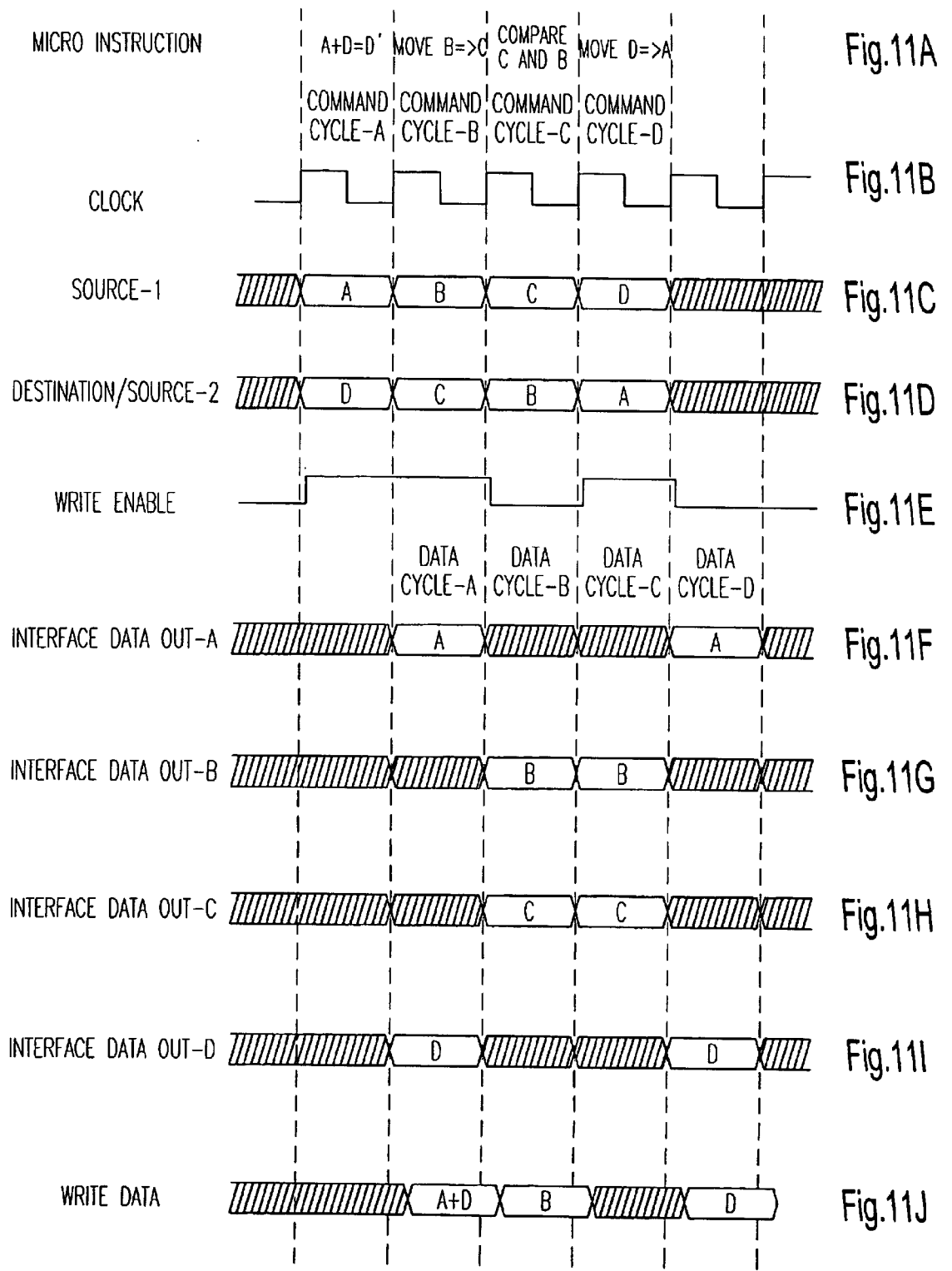
FIGS. 11A–11J illustrate an example timing diagram of the pipelined single cycle ME instruction execution according to an embodiment of the present invention.

FIGS. 11A–11J illustrate an example timing diagram of the pipelined single cycle ME instruction execution according to an embodiment of the present invention. FIG. 11A illustrates a flow of different ME instructions at different clock cycles. FIG. 11B illustrates a clock at different control cycles. For example, the first instruction may be an ADD instruction at control cycle—A (add the contents of interface A and interface D, A+D=D'). The second instruction may be a MOVE instruction at control cycle—B (move the contents of interface B to the address of interface C, MOVE B to C). The third instruction may be a COMPARE instruction at control cycle—C (compare the contents of interface C and interface B, COMPARE C and B). The fourth instruction may be another MOVE instruction at control cycle—D (MOVE D to A). FIG. 11C illustrates a sequence of memory address from Source-1. FIG. 11D illustrates a sequence of memory address from Destination/Source-2. FIG. 11E illustrates a system write enable (system control). FIGS. 11F–11I illustrate the interface data outputs, A–D from, for example, the host interface 712, the address translation interface 714, the context memory interface 716, and the local bus interface 718 at the next data cycle, for example, data cycle A, data cycle B, data cycle C and data cycle D. FIG. 11J illustrates a system write enable (system control).

There may be 32 different ME instructions available from the Instruction Memory 850. In some instructions that the Micro-Engine (ME) 710 executes, for example, a COMPARE instruction, there is no destination, but there are two sources. One source address may be compared with another source address. The write data bus may be used as both a source and a destination, where as the control bus may be used to transport address controls. The interface blocks may supply data to the Micro-Engine (ME) 710 which may, in turn, decode the ME instructions, and determine which inputs to push through to the ALU 820.

As shown in FIG. 11A, the first ME instruction may be an ADD instruction. The interface data A from the host interface 712 may be addressed as source-1 during the control cycle—A as shown in FIG. 11C, and likewise, interface data D from the local bus interface 718 may also be addressed as source-2 as shown in FIG. 11I. In response thereto, the host interface 712 may supply data A at a next cycle (data cycle-A) as shown in FIG. 11F, and at the same time, the local bus interface 718 may supply data D at the next cycle (data cycle—D) as shown in FIG. 11I. The Micro-Engine (ME) 710 may supply the data to the ALU 820 to perform an addition and supply the result A+D on the write data bus 1010. If the write enable is asserted, then the destination, which is D, may write the result A+D into the interface blocks.

The next instruction may be a MOVE instruction requesting to move the contents of interface B to interface C. The interface B and interface C may be addressed as source-1 and source-2. The address translation interface 714 and the context memory interface 716 may supply data B and data C respectively at the next cycle as shown in FIGS. 11G and 11H. If the write enable is asserted, data C may eventually get to write data. In the meanwhile, the Instruction Decoder 830 sends an ALU function select to the ALU 840 to generate data B on the write data bus 1010.

The next instruction may be a COMPARE instruction requesting to compare the contents of interface C and interface B. The interface C and interface B may be addressed as source-1 and source-2. The context memory interface 716 and the address translation interface 714 may supply data C and data B respectively at the next cycle as shown in FIGS. 11G and 11H. No results for the compare instruction may be provided on the write data bus 1010. Rather, the results for compare instructions may reside within the Micro-Engine (ME) 710.

FIGS. 11A–11J are simply examples of how the control bus and the write data bus are piped. Pipelining the control cycle and data cycle allows single cycle ME instruction execution to process NGIO/InfiniBand cells with minimum latency.

In addition to the pipelined architecture, the number of ME cycles needed for packet transfers by the Micro-Engine (ME) 710 can also be optimized. Memory addresses may be utilized without increasing the number of address bits which reduce the overall cost of the chip. More specifically, the information required for the Micro-Engine (ME) 710 to transfer data packets across the switched fabric 100' is stored in registers and memory locations of different interface blocks of the micro-controller subsystem 700, including the host interface 712, the address translation interface 714, the context memory interface 716, the local bus interface 718, the completion queue interface 720, and the FIFO interface 722A–722B. These registers and memory locations may be accessed using specific addresses. The number of addresses may depend on the number of registers/memory locations that need to be accessed by the Micro-Engine (ME) 712. The $\log_2$ # of addresses (address bits) may correspond to the width of the address bits used in the chip. The larger the number of registers, the greater the address-bits. The greater the address bits, the more routing and decoding need to occur, and hence the higher the cost of the chip.

For each request to transfer data packets across the switched fabric 100', there is a minimal set of registers that are needed to transfer data packets. Some of the registers are read-only (static), some are write-only and some are read-write. These read-only, write-only and read-write registers may reside in all interface blocks 712–722. Write-only registers are frequently used by interface blocks other than Micro-Engine (ME) 710 to transfer data packets. Data packets may be transported through system Write Data bus 1010. Control information issued from the Micro-Engine (ME) 710 to control reading and writing registers/memory locations may be transported through different lines of system Control bus 1020, namely, a ME Source Address line (me_src_addr line) which controls the register that is providing read data to the Micro-Engine (ME) 710, a ME Write Enable line (me_write_en line) which controls whether a register/memory location is written or NOT, and a ME Destination Address line (me_dest_addr line) which controls the register/memory location that the read data is written into. However, some of the registers have to be duplicated in order to reduce the number of cycles needed to transfer a data packet. In those cases, if each and every register may be addressed uniquely, then multiple writes need to occur to update the duplicate registers. For instance, if the registers that are needed for data transfers reside in the FIFO interface 722, the Micro-Engine (ME) 710 may access those registers to build cell headers and then perform a series of moves to obtain information from registers of a different interface block such as the local bus interface 718 for data transfer operations. As a result, a large number of registers/memory locations and the memory address bits are needed. In addition, multiple ME cycles are required for data transfer operations.

Figure 12:
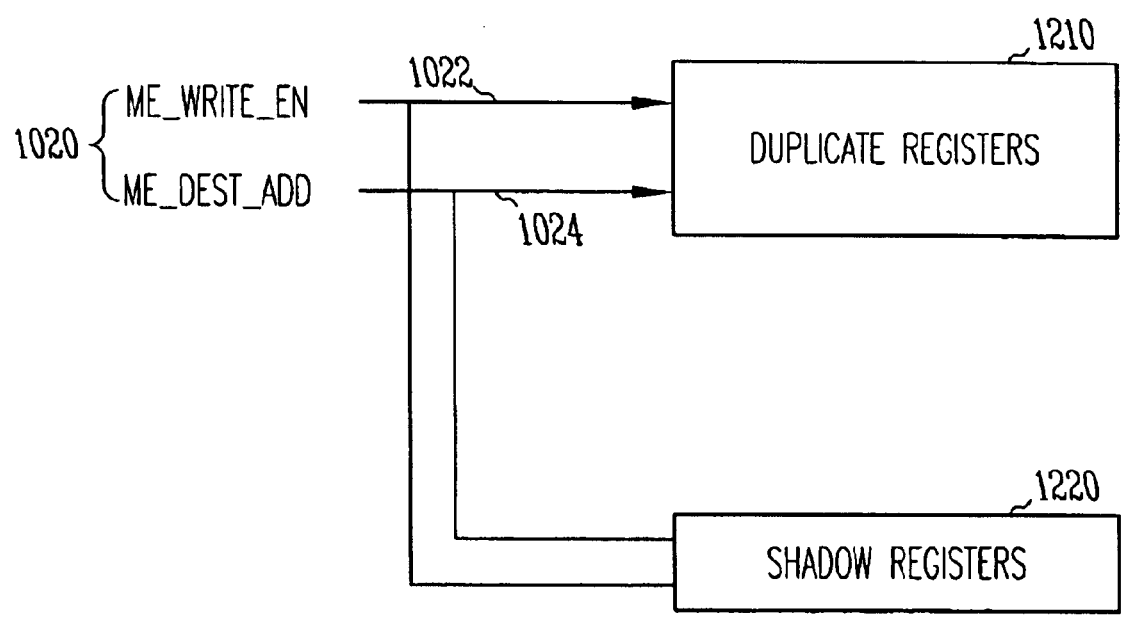
FIG. 12 illustrates an example set of registers used to optimize the number of ME cycles needed for data transfers according to an embodiment of the present invention.

Turning now to FIG. 12, an example set of registers 1210 and 1220 used to optimize the number of ME cycles needed for data transfers according to an embodiment of the present invention is illustrated. Supplemental registers are not directly addressable by the Micro-Engine (ME) 710, and may be designated as Shadow Registers (SR) 1220, since they serve as a shadow of registers that are needed for data transfer operations. Normal registers are directly addressable by the Micro-Engine (ME) 710, and may be designated as Duplicate Registers 1210 since they have corresponding Shadow Registers (SR) for data transfer operations. Duplicate Registers 1210 may reside in all interface blocks, for example, in the FIFO interface 722, whereas the Shadow Registers 1220 may reside only in the local bus interface 718. However, the Shadow Registers 1220 are connected to the same ME Write Enable line (me_write_en line) 1022 and a ME Destination Address line (me_dest_addr line) 1024 of the common system Control bus 1020 (not shown, the system Write Data bus) that are connected to the Duplicate Registers 1010. The number of Duplicate Registers 1210 may be restricted by the Micro-Engine (ME) address space, for example, 128 registers, but not the Shadow Registers 1220. These Shadow Registers 1220 may contain corresponding duplicate register/memory locations of the Duplicate Registers 1210 whose values get updated by the Micro-Engine (ME) 710.

The purpose of the Shadow Registers 1220 is to provide hardware assist to optimize the number of ME cycles needed for data transfers. The Shadow Registers 1220 are connected to the ME Write Enable line (me_write_en line) 1022 and a ME Destination Address line (mc_dest_addr line) 1024 of the common system Control bus 1020 so as to snoop for an NGIO/InfiniBand header to determine when the duplicate register/memory location is written by the Micro-Engine (ME) 710. Then, the Shadow Registers 1220 update their own values when the Duplicate Registers 1210 are written by the Micro-Engine (ME) 710. As a result, Shadow Registers need not be updated separately by the Micro-Engine (ME) 710 every time their duplicate copy value is changed. This saves valuable ME cycles during packet transfers. In addition, since the Shadow Registers 1220 are not directly addressed by the Micro-Engine (ME) 710, they are not factored in ME memory address bits. Hence, the memory addresses may be utilized effectively without increasing the number of memory address bits. In addition, the area of the chip and the cost of the chip can be effectively conserved. Snooping advantageously reduces the number of ME cycles required for data transfers, which translates to more efficient packet transfers and better chip performance on the serial link. This is because the Micro-Engine (ME) 710 does not have to do a series of moves between duplicate registers from, for example, the FIFO interface 722, to shadow registers located in the local bus interface 718. In addition, the number of address registers in the Micro-Engine (ME) 710 is reduced because these Shadow Registers reside outside of the Micro-Engine (ME) 710.

As described from the foregoing, the host-fabric adapter installed at a host system in a data network using a channel-based, switched fabric architecture according to an embodiment of the present invention effectively manages NGIO/InfiniBand™ channels and support data movement operations between communication devices at a host system or between host systems connected together directly or via a data network using a channel-based, switched fabric architecture. The host-fabric adapter is optimized for NGIO/InfiniBand™ functionality with minimal hardware investment, including controlling execution of NGIO/InfiniBand™ protocols with minimal pipelining and NGIO/InfiniBand™ cell data processing with minimal cell latency. Micro-control subsystem of the host-fabric adapter is designed to control execution of NGIO/InfiniBand™ protocols with minimal pipelining, and to control overall NGIO/InfiniBand™ cell processing with minimum cell latency. Control cycle and data cycle are pipelined to advantageously allow single cycle ME instruction execution in order to reduce the number of ME instructions needed to process NGIO/InfiniBand™ cells with minimum latency.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but is not limited to, a local area network (LAN), a wide area network (WAN), a campus area network (CAN), a metropolitan area network (MAN), a global area network (GAN) and a system area network (SAN) using Next Generation I/O (NGIO), Future I/O (FIO) and Server Net, and a LAN system including Ethernet, FDDI (Fiber Distributed Data Interface) Token Ring LAN, Asynchronous Transfer Mode (ATM) LAN, Fiber Channel, and Wireless LAN. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host-fabric adapter installed at a host system for connecting to a switched fabric of a data network, comprising:

a micro-controller subsystem configured to establish connections and support data transfers via said switched fabric, said micro-controller subsystem including a Micro-Engine (ME) which executes a ME instruction to send source and destination addresses during a control cycle, and interface logic blocks which supply addressed data from designated sources to the Micro-Engine (ME) at the same time for execution of said ME instruction during a data cycle subsequent to said control cycle; and a serial interface which provides an interface with said switched fabric;

said interface logic blocks having:

a host interface which provides an interface to said host system, and which is addressable by write data and system controls from said Micro-Engine (ME), via a system data bus and a system control bus;

an address translation interface provides an interface for address translation, and which is addressable by write data and system controls from said Micro-Engine (ME), via said system data bus and said system control bus;

a Virtual Interface (VI) context memory which provides an interface to host software, and which is addressable by write data and system controls from said Micro-Engine (ME), via said system data bus and said system control bus, for providing the necessary context for a work queue pair (WQP) used for sending and receiving a NGIO/InfiniBand™ cell;

a local bus interface which provides an interface to a local bus, and which is addressable by write data and system controls from said Micro-Engine (ME), via said system data bus and said system control bus, for supporting system accessible context connections and data transfer operations;

a completion queue/doorbell manager interface which provides an interface to completion queues, and doorbell and memory registration rules in accordance with a VI architecture, and which is addressable by write data and system controls from said Micro-Engine (ME), via said system data bus and said system control bus; and a first-in/first-out (FIFO) interface which provides an interface to said switched fabric via said serial interface, and which is addressable by write data and system controls from said Micro-Engine (ME), via said system data bus and said system control bus, for enabling exchange of requests and/or data packets from said switched fabric.

2. The host-fabric adapter as claimed in claim 1, wherein said ME instruction is executed for designated ME functions including, but not limited to, physical address translations, host descriptor fetches, doorbell management, data movements and completion queue management.

3. The host-fabric adapter as claimed in claim 1, wherein said Micro-Engine (ME) is configured to pipeline said control cycle and said data cycle for enabling single cycle ME instruction execution, including:

one or more Data Multiplexers arranged to supply appropriate interface data based on said ME instruction;

an Instruction Memory arranged to provide said ME instruction based on download microcode;

an Arithmetic Logic Unit (ALU) arranged to perform mathematical, logical and shifting operations, and supply write data to said interface logic blocks, via said system write data bus; and an Instruction Decoder arranged to supply system controls to said interface logic blocks, via said system control bus, to execute said ME instruction from said Instruction Memory to control operations of said Data Multiplexers, and to determine the functions of said Arithmetic Logic Unit (ALU).

4. The host-fabric adapter as claimed in claim 3, wherein said ME instructions each includes an OpCode field used to control said Arithmetic Logic Unit (ALU), and a destination field and a source field used to control operation of one or more Data Multiplexers.

5. The host-fabric adapter as claimed in claim 4, wherein said one or more Data Multiplexers supply two parallel 32-bit buses (A-bus and B-bus) data inputs based on decode of the destination field and the source field of each ME instruction from said interface logic blocks to said Arithmetic Logic Unit (ALU).

6. The host-fabric adapter as claimed in claim 4, wherein said Arithmetic Logic Unit (ALU) performs functions that are based on the OpCode field of each ME instruction, including, but are not limited to, Add, Subtract, OR, XOR, AND, Compare, Rotate Right, Shift Left, Bit test and Move (pass through) operations.

7. The host-fabric adapter as claimed in claim 4, wherein said Instruction Decoder decodes each ME instruction and provides function select signals to said Arithmetic Logic Unit (ALU) to perform selected ME functions.

8. The host-fabric adapter as claimed in claim 4, (wherein said Instruction Memory corresponds to a static random-access-memory (SRAM) provided to store microcode that are downloadable for providing said ME instruction to said Instruction Decoder.

9. The host-fabric adapter as claimed in claim 3, wherein said source and destination addresses are extracted from said ME instruction and are sent to said interface logic blocks by the Instruction Decoder of said Micro-Engine (ME) for supplying the addressed data to the Arithmetic Logic Unit (ALU) of said Micro-Engine (ME).

10. The host-fabric adapter as claimed in claim 9, wherein, when said ME instruction decoded by the Instruction Decoder of said Micro-Engine (ME) indicates that two sources are to be used, the Instruction Decoder generates Source1 Select and Source2 Select signals to control the respective Data Multiplexers to supply the correct input data to the Arithmetic Logic Unit (ALU) of said Micro-Engine.

11. The host-fabric adapter as claimed in claim 3, wherein each of said interface logic blocks, including the host interface, the address translation interface, the VI context memory interface, the local bus interface, the completion queue/door bell management interface, and the FIFO interface, contains a set of registers and memory locations addressable by said Micro-Engine (ME), via said system control bus, for data transfer operations.

12. The host-fabric adapter as claimed in claim 11, wherein said system control bus contains a ME Source Address line which controls a register that is providing read data to said Micro-Engine (ME), a ME Write Enable line which controls whether a register/memory location is written, and a ME Destination Address line which controls the register/memory location that the read data is written into.

13. The host-fabric adapter as claimed in claim 12, wherein said local bus interface is configured to include Shadow Registers which are not addressable by said Micro-Engine (ME) and serve as a shadow of registers that are needed for data transfer operations, said Shadow Registers being connected to the same ME Write Enable line and ME Destination Address line of the system Control bus so as to snoop for a packet header to determine when the duplicate register/memory location is written by said Micro-Engine (ME), and update respective values when the registers that are needed for data transfer operations are written by said Micro-Engine (ME).

14. The host-fabric adapter as claimed in claim 13, wherein said registers that are needed for data transfer operations are included in the FIFO interface.

15. A host-fabric adapter installed at a host system for connecting to a switched fabric of a data network, comprising:

interface logic blocks arranged to provide an interface with said host system and said switched fabric, and to supply addressed data from designated sources; and a Micro-Engine (ME) connected to said interface logic blocks, arranged to establish connections and support data transfers via said switched fabric, and configured to execute a ME instruction to send source and destination addresses to said interface logic blocks during a control cycle for enabling said interface logic blocks to supply addressed data from designated sources for execution of said ME instruction during a data cycle subsequent to said control cycle, said Micro-Engine (ME) comprising:

one or more Data Multiplexers arranged to supply appropriate interface data based on said ME instruction;

an Instruction Memory arranged to provide said ME instruction based on downloadable microcode;

an Arithmetic Logic Unit (ALU) arranged to perform mathematical, logical and shifting operations, and to supply write data to said interface logic blocks; and an Instruction Decoder arranged to supply system controls to said interface logic blocks, via a system control bus, to execute said ME instruction from said Instruction Memory to control operations of said Data Multiplexers, and to determine the functions of said Arithmetic Logic Unit (ALU).

16. A host-fabric adapter installed at a host system for connecting to a switched fabric of a data network, comprising:

interface logic blocks arranged to provide an interface with said host system and said switched fabric, and to supply addressed data from designated sources; and a Micro-Engine (ME) connected to said interface logic blocks, arranged to establish connections and support data transfers via said switched fabric, and configured to execute a ME instruction to send source and destination addresses to said interface logic blocks during a control cycle for enabling said interface logic blocks to supply addressed data from designated sources for execution of said ME instruction during a data cycle subsequent to said control cycle, said Micro-Engine (ME) comprising:

one or more Data Multiplexers arranged to supply appropriate interface data based on said ME instruction;

an Instruction Memory arranged to provide said ME instruction based on downloadable microcode;

an Arithmetic Logic Unit (ALU) arranged to perform mathematical, logical and shifting operations, and to supply write data to said interface logic blocks; and an Instruction Decoder arranged to supply system controls to said interface logic blocks, via a system control bus, to execute said ME instruction from said Instruction Memory to control operations of said Data Multiplexers, and to determine the functions of said Arithmetic Logic Unit (ALU); said interface logic blocks comprise:

a host interface which provides an interface to said host system, and which is addressable by write data and system controls from said Micro-Engine (ME), via a system data bus and a system control bus;

an address translation interface provides an interface for address translation, and which is addressable by write data and system controls from said Micro-Engine (ME), via said system data bus and said system control bus;

a Virtual Interface (VI) context memory which provides an interface to host software, and which is addressable by write data and system controls from said Micro-Engine (ME), via said system data bus and said system control bus, for providing the necessary context for a work queue pair (WQP) used for sending and receiving a data packet;

a local bus interface which provides an interface to a local bus, and which is addressable by write data and system controls from said Micro-Engine (ME), via said system data bus and said system control bus, for supporting system accessible context connections and data transfer operations;

a completion queue/doorbell manager interface which provides an interface to completion queues, and doorbell and memory registration rules in accordance with a VI architecture, and which is addressable by write data and system controls from said Micro-Engine (ME), via said system data bus and said system control bus; and a first-in/first-out (FIFO) interface which provides an interface to said switched fabric via said serial interface, and which is addressable by write data and system controls from said Micro-Engine (ME), via said system data bus and said system control bus, for enabling exchange of requests and/or data packets from said switched fabric.

17. The host-fabric adapter as claimed in claim 16, wherein said Instruction Memory corresponds to a static random-access-memory (SRAM) provided to store microcode that are downloadable for providing said ME instruction to said Instruction Decoder.

18. The host-fabric adapter as claimed in claim 16, wherein said source and destination addresses are extracted from said ME instruction and are sent to said interface logic blocks by the Instruction Decoder of said Micro-Engine (ME) for supplying the addressed data to the Arithmetic Logic Unit (ALU) of said Micro-Engine (ME).

19. The host-fabric adapter as claimed in claim 16, wherein, when said ME instruction decoded by the Instruction Decoder of said Micro-Engine (ME) indicates that two sources are to be used, the Instruction Decoder generates Source1 Select and Source2 Select signals to control the respective Data Multiplexers to supply the correct input data to the Arithmetic Logic Unit (ALU) of said Micro-Engine.

20. The host-fabric adapter as claimed in claim 16, wherein each of said interface logic blocks, including the host interface, the address translation interface, the VI context memory interface, the local bus interface, the completion queue/door bell management interface, and the FIFO interface, contains a set of registers and memory locations addressable by said Micro-Engine (ME), via said system control bus, for data transfer operations.

21. The host-fabric adapter as claimed in claim 20, wherein said system control bus contains a ME Source Address line which controls a register that is providing read data to said Micro-Engine (ME), a ME Write Enable line which controls whether a register/memory location is written, and a ME Destination Address line which controls the register/memory location that the read data is written into.

22. The host-fabric adapter as claimed in claim 21, wherein said local bus interface is configured to include Shadow Registers which are not addressable by said Micro-Engine (ME) and serve as a shadow of registers that are needed for data transfer operations, said Shadow Registers being connected to the same ME Write Enable line and ME Destination Address line of the system Control bus so as to snoop for a packet header to determine when the duplicate register/memory location is written by said Micro-Engine (ME), and update respective values when the registers that are needed for data transfer operations are written by said Micro-Engine (ME).

23. The host-fabric adapter as claimed in claim 22, wherein said registers that are needed for data transfer operations are included in the FIFO interface.

24. A micro-controller subsystem installed in a host-fabric adapter for access to a switched fabric, comprising:

a Micro-Engine (ME) which executes a ME instruction to send source and destination addresses during a control cycle; and interface logic blocks which supply addressed data from one or more sources to said Micro-Engine (ME) for execution of said ME instruction during a data cycle subsequent to said control cycle;

said interface logic blocks having:

a host interface which provides an interface to said host system, and which is addressable by write data and system controls from said Micro-Engine (ME), via a system data bus and a system control bus;

an address translation interface provides an interface for address translation, and which is addressable by write data and system controls from said Micro-Engine (ME), via said system data bus and said system control bus;

a Virtual Interface (VI) context memory which provides an interface to host software, and which is addressable by write data and system controls from said Micro-Engine (ME), via said system data bus and said system control bus, for providing the necessary context for a work queue pair (WQP) used for sending and receiving a data packet;

a local bus interface which provides an interface to a local bus, and which is addressable by write data and system controls from said Micro-Engine (ME), via said system data bus and said system control bus, for supporting system accessible context connections and data transfer operations;

a completion queue/doorbell manager interface which provides an interface to completion queues, and doorbell and memory registration rules in accordance with a VI architecture, and which is addressable by write data and system controls from said Micro-Engine (ME), via said system data bus and said system control bus; and a first-in/first-out (FIFO) interface which provides an interface to said switched fabric via said serial interface, and which is addressable by write data and system controls from said Micro-Engine (ME), via said system data bus and said system control bus, for enabling exchange of requests and/or data packets from said switched fabric.

25. The micro-controller subsystem as claimed in claim 24, wherein said Micro-Engine (ME) comprises:

one or more Data Multiplexers arranged to supply appropriate interface data based on said ME instruction;

an Instruction Memory arranged to provide said ME instruction based on downloadable microcode;

an Arithmetic Logic Unit (ALU) arranged to perform mathematical, logical and shifting operations, and to supply write data to said interface logic blocks; and an Instruction Decoder arranged to supply system controls to said interface logic blocks, via a system control bus, to execute said ME instruction from said Instruction Memory to control operations of said Data Multiplexers, and to determine the functions of said Arithmetic Logic Unit (ALU).

26. A host-fabric adapter, comprising:

a Micro-Engine (ME) configured to perform data transfer operations;

interface logic blocks which contain a set of registers and memory locations addressable by said Micro-Engine (ME), via a system control bus, for data transfer operations, said system control bus including a Source Address line which controls a register that is providing read data to said Micro-Engine (ME), a Write Enable line which controls whether a register/memory location is written, and a Destination Address line which controls the register/memory location that the read data is written into; and Shadow Registers included in a selected interface logic block which are not addressable by said Micro-Engine (ME) and serve as a shadow of registers that are needed for data transfer operations, said Shadow Registers being connected to the same Write Enable line and Destination Address line of the system Control bus so as to snoop for a packet header to determine when the duplicate register/memory location is written by said Micro-Engine (ME), and obtain updates when the registers that are needed for data transfer operations are written by said Micro-Engine (ME).

27. The host-fabric adapter as claimed in claim 26, wherein said interface logic blocks comprise:

a host interface which provides an interface to said host system, and which is addressable by write data and system controls from said Micro-Engine (ME), via a system data bus and a system control bus;

an address translation interface provides an interface for address translation, and which is addressable by write data and system controls from said Micro-Engine (ME), via said system data bus and said system control bus;

a Virtual Interface (VI) context memory which provides an interface to host software, and which is addressable by write data and system controls from said Micro-Engine (ME), via said system data bus and said system control bus, for providing the necessary context for a work queue pair (WQP) used for sending and receiving a data packet;

a local bus interface which provides an interface to a local bus, and which is addressable by write data and system controls from said Micro-Engine (ME), via said system data bus and said system control bus, for supporting system accessible context connections and data transfer operations;

a completion queue/doorbell manager interface which provides an interface to completion queues, and doorbell and memory registration rules in accordance with a VI architecture, and which is addressable by write data and system controls from said Micro-Engine (ME), via said system data bus and said system control bus; and a first-in/first-out (FIFO) interface which provides an interface to said switched fabric via said serial interface, and which is addressable by write data and system controls from said Micro-Engine (ME), via said system data bus and said system control bus, for enabling exchange of requests and/or data packets from said switched fabric.

28. The host-fabric adapter as claimed in claim 26, wherein said Micro-Engine (ME) comprises:

one or more Data Multiplexers arranged to supply appropriate interface data based on said ME instruction;

an Instruction Memory arranged to provide said ME instruction based on downloadable microcode;

an Arithmetic Logic Unit (ALU) arranged to perform mathematical, logical and shifting operations, and to supply write data to said interface logic blocks; and an Instruction Decoder arranged to supply system controls to said interface logic blocks, via said system control bus, to execute said ME instruction from said Instruction Memory to control operations of said Data Multiplexers, and to determine the functions of said Arithmetic Logic Unit (ALU).

* * * * *